US006967816B2

(12) United States Patent
Hiraguchi (10) Patent No.: US 6,967,816 B2
(45) Date of Patent: Nov. 22, 2005

(54) TAPE CARTRIDGE WITH REAR WALL EXTENDED SURFACE POSITIONED IN REGION OF REFERENCE SURFACE FORMED AROUND POSITION-REGULATING HOLE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 245 days.

(21) Appl. No.: 10/443,140

(22) Filed: May 22, 2003

(65) Prior Publication Data

US 2005/0109868 A1 May 26, 2005

(30) Foreign Application Priority Data

May 29, 2002 (JP) .............................. 2002-156420

(51) Int. Cl.[7] .......................................... G11B 23/107

(52) U.S. Cl. .................... 360/132; 242/347; 242/348.2

(58) Field of Search ....................... 360/132; 242/348, 242/348.1, 348.2, 348.3, 348.4, 347

(56) References Cited

U.S. PATENT DOCUMENTS

| 5,063,554 A | | 11/1991 | Uehara | |
|---|---|---|---|---|
| 5,465,187 A | * | 11/1995 | Hoge et al. | ................. 360/132 |
| 5,702,062 A | * | 12/1997 | Kaku et al. | ................. 360/132 |
| 6,538,842 B1 | * | 3/2003 | von Alten | .................... 360/93 |
| 2003/0016471 A1 | * | 1/2003 | Hiraguchi et al. | .......... 360/132 |

* cited by examiner

Primary Examiner—Craig A. Renner
(74) Attorney, Agent, or Firm—Sughrue Mion, PLLC (57) ABSTRACT

A recording tape cartridge includes: a case within which a reel wound with a recording tape is housed; a position-regulating hole that is formed in a lower surface of the case and into which a positioning member of a drive device is inserted; a reference surface formed around the position-regulating hole in the lower surface of the case; an allowance portion formed as a recess portion in an upper surface of the case, the allowance portion allowing an engaging member disposed at the drive device to advance therein and thereby preventing the engaging member from abutting against a front surface of the case when recording and playback of the recording tape cartridge is possible in the drive device; and a rear wall formed at the allowance portion, wherein a case-thickness-direction extended surface of the rear wall is positioned at least within a region of the reference surface.

7 Claims, 4 Drawing Sheets

TAPE CARTRIDGE WITH REAR WALL EXTENDED SURFACE POSITIONED IN REGION OF REFERENCE SURFACE FORMED AROUND POSITION-REGULATING HOLE

BACKGROUND OF THE INVENTION

1. Field of the Invention

The present invention relates to a recording tape cartridge including a case within which is housed a single reel wound with a recording tape, such as a magnetic tape, mainly used as a recording and playback medium for computers and the like.

2. Description of the Related Art

Magnetic tape cartridges including a case within which is housed a single reel wound with a magnetic tape used as a recording and playback medium for computers and the like have conventionally been known. A leader member, such as a leader pin, a leader tape, or a leader block, is disposed at a leading end of the magnetic tape. Pull-out means disposed at a drive device pulls out the leader member through an opening in the magnetic tape cartridge and winds the magnetic tape fixed to the leader member around a take-up reel of the drive device.

A reel gear is annularly disposed in a center of a bottom surface of the reel, which is exposed through an open hole that penetrates a bottom surface of the magnetic tape cartridge. A drive gear disposed at a rotating shaft of the drive device meshes with the reel gear, whereby the reel is rotatingly driven. Data can be recorded on the magnetic tape, and data recorded on the magnetic tape can be played back, by synchronously rotating the reel of the magnetic tape cartridge and the take-up reel of the drive device.

Magnetic tape cartridges having such a configuration have advantages in that housing space during storage is small and a large amount of information can be recorded therein. However, as described above, because it is necessary for various types of leader members to be pulled out by the pull-out means disposed at the drive device, and because the drive gear must mesh with the reel gear, positional precision when the magnetic tape cartridge is loaded into the drive device has become a very important issue.

SUMMARY OF THE INVENTION

Thus, in light of the above-described circumstances, it is an object of the present invention to obtain a recording tape cartridge that can improve positional precision when the recording tape cartridge is loaded into a drive device.

In order to achieve this object, a recording tape cartridge of the invention comprises: a case within which a reel wound with a recording tape is housed; a position-regulating hole that is formed in a lower surface of the case and into which a positioning member of a drive device is inserted; a reference surface formed around the position-regulating hole in the lower surface of the case; an allowance portion formed as a recess portion in an upper surface of the case, the allowance portion allowing an engaging member disposed at the drive device to advance toward the recess portion and thereby preventing the engaging member from abutting against a front surface of the case in a direction in which the case is inserted when recording and playback of the recording tape cartridge is possible in the drive device; and a rear wall formed at the allowance portion, wherein a case-thickness-direction extended surface of the rear wall is positioned at least within a region of the reference surface.

According to this configuration, when recording and playback in the drive device is possible, the engaging member of the drive device is prevented, by the allowance portion formed at the upper surface of the case, from abutting against the front surface of the case in the direction in which the case is inserted. The engaging member, whose abutment against the front surface of the case in the direction in which the case is inserted has been prevented, abuts against the rear wall of the concave allowance portion in a case where other position-regulating means of the recording tape cartridge with respect to the drive device is not disposed, e.g., in a case where another engaging member fails to abut against a position-regulating recess portion formed in the front surface in the direction in which the case is inserted.

Therefore, by configuring the invention so that the case-thickness-direction extended surface of the rear wall is at least within the region of the reference surface formed at the lower surface of the recording tape cartridge (i.e., so that it substantially matches part of the reference surface), positional precision of the position-regulating hole, which is important for positioning the recording tape cartridge with respect to the drive device, can be improved.

In the recording tape cartridge of the present invention, positioning of the position-regulating hole with respect to the positioning member of the drive device to be inserted therein is primarily conducted by the other engaging member of the drive device abutting against the position-regulating recess portion formed in the front surface of the case in the direction in which the case is inserted. However, positioning of the position-regulating hole with respect to the positioning member of the drive device can be aided (i.e., made reliable) by the engaging member abutting against the rear wall of the allowance portion so that the positioning member of the drive device is appropriately inserted into the position-regulating hole of the recording tape cartridge, even in cases where the position-regulating recess portion fails to be formed or the engaging member for abutting against the position-regulating recess portion is not disposed at the drive device. Therefore, positional precision of the recording tape cartridge with respect to the drive device can be improved.

DETAILED DESCRIPTION OF THE INVENTION

A recording tape cartridge (magnetic tape cartridge) 10 pertaining to an embodiment of the invention will be described below on the basis of FIGS. 1 through 5. For convenience of explanation, the direction in which the recording tape cartridge 10 is loaded into a drive device will be represented by arrow A and referred to as the front direction (front side) of the recording tape cartridge 10. The direction of arrow B, which is orthogonal to the direction of arrow A, will be referred to as the right direction.

Figure 1:
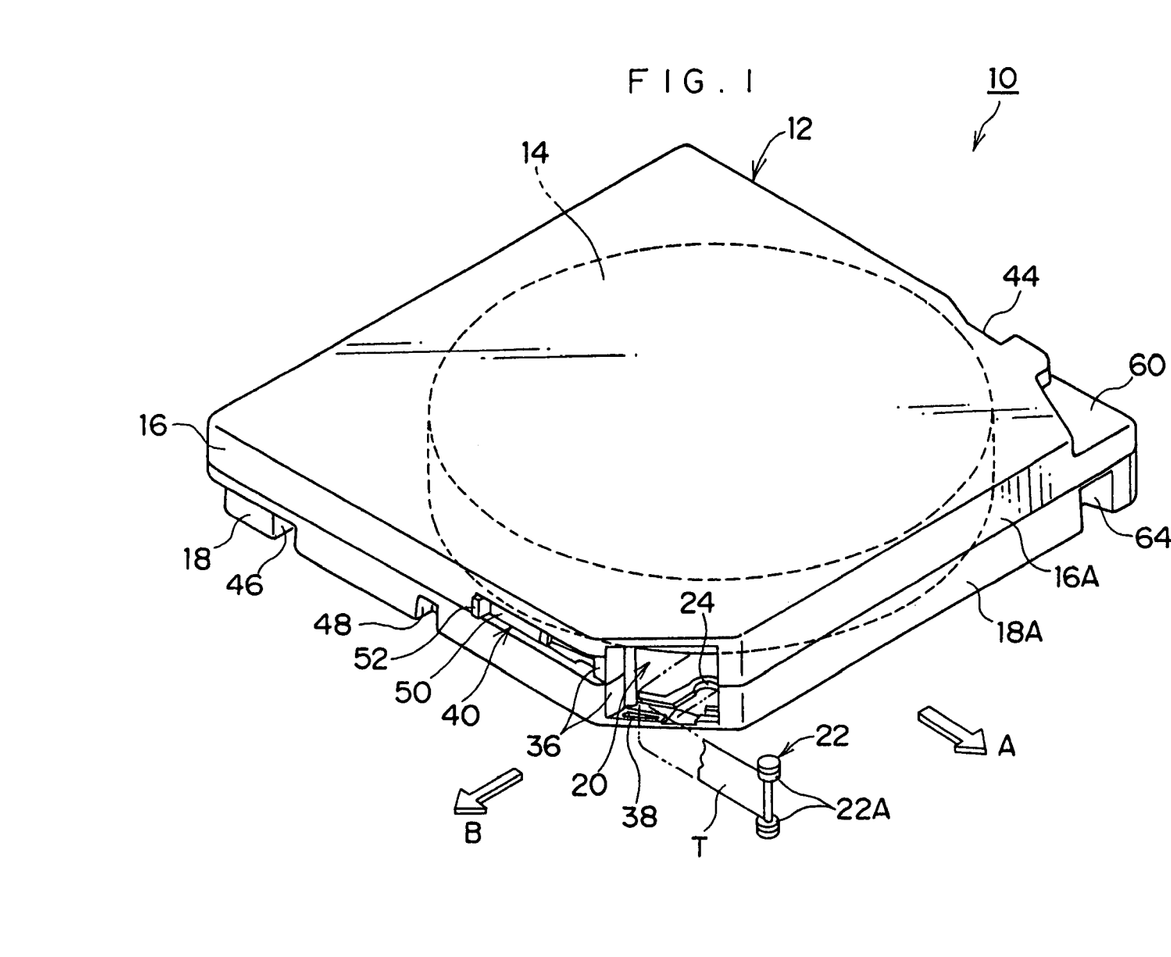
FIG. 1 is a schematic perspective view of a recording tape cartridge of the invention.
Figure 2:
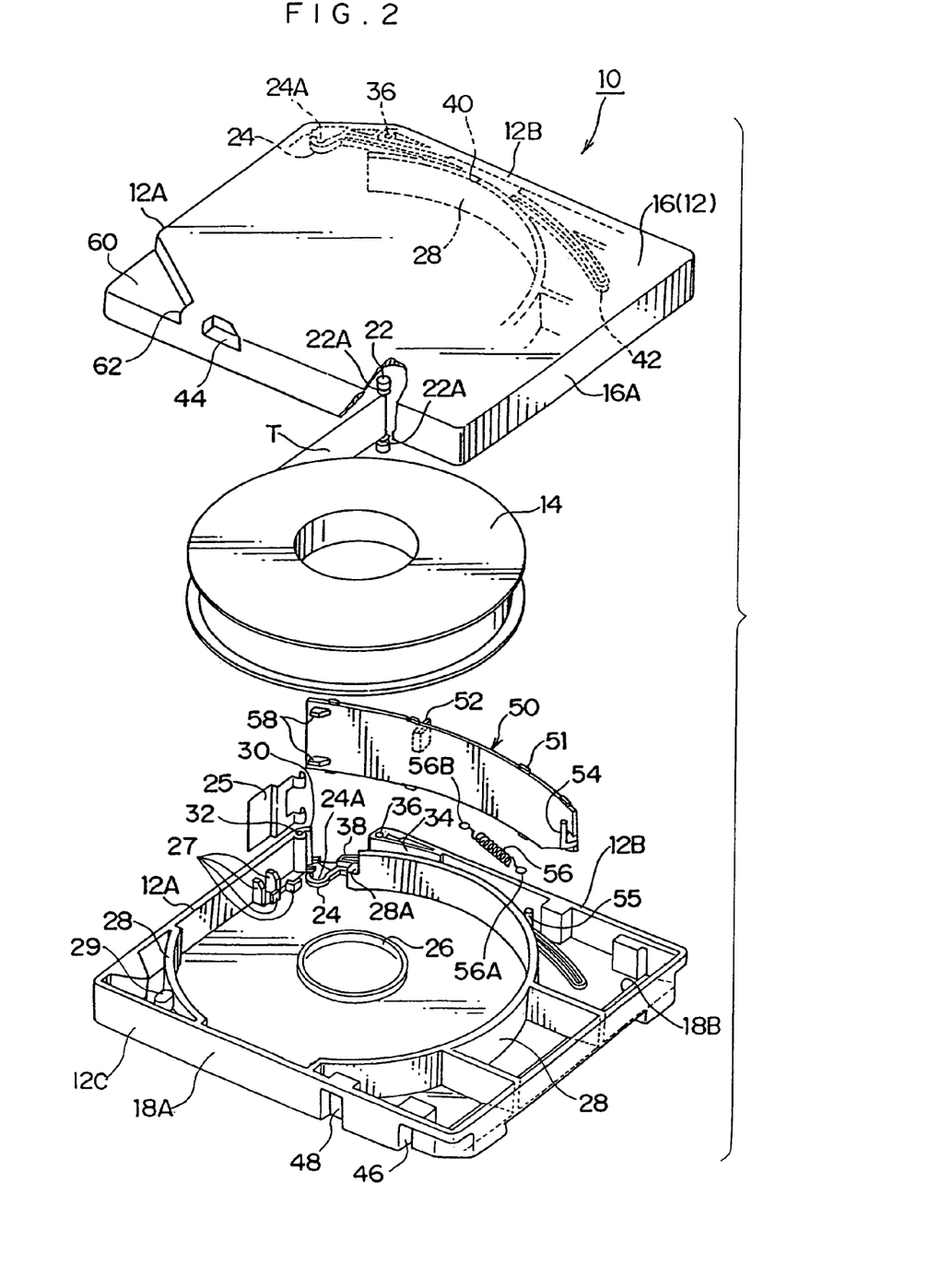
FIG. 2 is a schematic exploded perspective view of the recording tape cartridge of FIG. 1.

The overall configuration of the recording tape cartridge 10 is shown in a perspective view in FIG. 1. A schematic exploded perspective view of the recording tape cartridge 10 is shown in FIG. 2. As shown in these drawings, the recording tape cartridge 10 includes a case 12, which is substantially rectangular in plan view and within which is rotatably housed a single reel 14. A magnetic tape T, which serves as a recording tape and is a medium for recording and playing back information, is wound around the reel 14.

The case 12 includes an upper case 16 and a lower case 18. The upper case 16 includes a peripheral wall 16A, and the lower case 18 includes a peripheral wall 18A. A front right corner portion, which is one corner portion at the front side in the direction in which the recording tape cartridge 10 is loaded into the drive device, of each of the upper case 16 and the lower case 18 is cut out. The peripheral wall 16A and the peripheral wall 18A are brought into contact with each other, whereby the upper case 16 is joined to the lower case 18 to form the case 12. A housing space for the reel 14, around which the magnetic tape T is wound, is disposed inside the case 12. A corner portion, from which the peripheral wall 16A of the upper case 16 and the peripheral wall 18A of the lower case 18 have been cut away, serves as an opening 20 through which the magnetic tape T is pulled out.

A leader pin 22, which is caught (engaged) and operatively pulled out by pull-out means of the drive device, is connected to a free end of the magnetic tape T that is pulled out through the opening 20. An annular groove 22A is formed in both end portions of the leader pin 22, which end portions of the leader pin 22 project from width-direction edge portions of the magnetic tape T. The annular grooves 22A are caught by hooks or the like of the pull-out means. Due to the structure described above, when the magnetic tape T is pulled out, the hooks do not contact and damage the magnetic tape T.

A pair of upper and lower pin retainers 24 that position and retain the leader pin 22 inside the case 12 is disposed inside the opening 20 of the case 12. The pin retainers 24 have a substantially semi-cylindrical shape, and both end portions of the leader pin 22 are retained in recess portions 24A in the pin retainers 24 in a state in which the leader pin 22 is vertically disposed therein. Outer peripheral walls of the pin retainers 24, at the side at which the magnetic tape T is pulled out, are open and serve as a gateway through which the leader pin 22 enters and exits.

A plate spring 25 is fixed and disposed in a spring retainer 27 near the pin retainers 24. The spring retainer 27 is disposed at an inner surface of a front wall 12A (a portion of the peripheral walls 16A and 18A at which outer surfaces thereof face the direction of arrow A). A base portion of the plate spring 25 is inserted into the spring retainer 27. Forked end portions of the plate spring 25 engage with the upper and lower ends of the leader pin 22 and retain the leader pin 22 in the pin retainers 24. When the leader pin 22 enters and exits the pin retainers 24, the end portions of the plate spring 25 appropriately elastically deform to allow movement of the leader pin 22.

Moreover, a gear opening 26, for exposing an unillustrated reel gear of the reel 14 to the outside, is disposed in a center portion of the lower case 18. The reel gear of the reel 14 meshes with a drive gear of the drive device, whereby the reel 14 is rotatably driven inside the case 12. The reel 14 is retained by play regulation walls 28 so that the reel 14 does not chatter. The play regulation walls 28 are partially disposed at respective inner surfaces of the upper case 16 and the lower case 18, and serve as an inner wall on a circular locus that is concentric with the gear opening 26.

A pair of short upper and lower slanted wall portions 30 that regulate a front edge portion of the opening 20 is disposed at a right end portion of the front wall 12A of the case 12. The slanted wall portions 30 curve along an open surface of the opening 20, and serve as dust prevention walls for preventing the ingress of dust and the like into the case 12. Also, a pair of upper and lower screw bosses 32 is connectedly disposed at an inner side of the front wall 12A in a leftward vicinity of the slanted wall portions 30.

A pair of upper and lower slanted wall portions 34, which are of a shape in plan view substantially along an outer peripheral surface of a door 50 described later, is connectedly disposed at an inner side of a front end portion of a right wall 12B (a portion of the peripheral walls 16A and 18A at which outer surfaces thereof face the direction of arrow B) of the case 12. Front end surfaces of the slanted wall portions 34 define a rear edge of the opening 20, and a pair of upper and lower screw bosses 36 is disposed at front end portions thereof.

A slit 40 of a predetermined length that serves as a window through which the outside of the case 12 communicates with the inside of the case 12 is disposed in the right wall 12B of the case 12, and is for exposing an operational protrusion 52 of the door 50 described later. The slit 40 is formed by cutting out a front side lower portion of the peripheral wall 16A of the upper case 16 that configures the right wall 12B, and the slit 40 also opens to the opening 20. Thus, an outer surface of the screw boss 36 in the upper case 16 is exposed through the slit 40 (see FIG. 1).

A recess portion 48 is formed at a rearward side of the lower case 18. The recess portion 48 is one in which a portion of the peripheral wall 18A (excluding an upper end of the peripheral wall 18A) is recessed inward of the case 12, in a substantially sideways "U" shape when seen in cross section, and upward from a lower surface of the case 12 (i.e., a bottom panel has been cut out). The recess portion 48 is also formed in a left wall of the case 12. The recess portions 48 may serve as engaging portions with which pulling means of the drive device engages, and/or bottom surfaces (downward-facing surfaces) of the recess portions 48 may serve as reference surfaces for positioning the recording tape cartridge 10 inside the drive device.

Recess portions 46 are formed at rearward sides of the recess portions 48. Each recess portion 46 is one in which a portion of the peripheral wall 18A (excluding the upper end of the peripheral wall 18A) is recessed inward of the case 12, in a substantially sideways "U" shape when seen in cross section, and upward from the lower surface of the case 12 (i.e., the bottom panel has been cut out). The recess portions 46 serve as engaging portions with which gripping means of a library device engages. By disposing these recess portions 46 and 48, torsion strength of the case 12 (lower case 18) is improved. Also, a recess portion 44, which is substantially trapezoidal when seen in plan view, is formed in an upper surface portion of a left wall of the upper case 16. The recess portion 44 serves as an engaging portion with which a retention member (not illustrated), for canceling torque accompanying movement of the door 50 in an opening direction when the opening 20 is opened, engages.

Guide wall portions 42 of a predetermined height (e.g., about 1.0 mm to about 1.5 mm), which support protruding portions 51 of the door 50 so as to sandwich the protruding portions 51 from both an inner surface side and an outer surface side, are disposed in the upper case 16 and the lower case 18, near the slanted wall portions 30 and from a vicinity of the opening 20 to a vicinity of the rear wall. The lengths of the guide wall portions 42 differ between the upper case 16 and the lower case 18, and the guide wall portions 42 are formed so that a rear side of the guide wall portion 42 of the upper case 16 is longer than that of the guide wall portion 42 of the lower case 18. The reason for this is because a memory board (not illustrated), in which various information is stored, is slantingly disposed at a predetermined angle at the right wall 12B side of a rear portion inner wall 18B of the lower case 18 so that the memory board can be detected by the drive device, which reads the information stored in the memory board from a lower surface side thereof, and by the library device, which reads the information stored in the memory board from a rear wall side thereof.

Rear end portions of the guide wall portions 42 are closed off in substantially arced shapes when seen in plan view, and respectively regulate the rearmost upper and lower protruding portions 51 so that the door 50 cannot move any further rearward than the rear end portions of the guide wall portions 42. Front end portions of the guide wall portions 42 are opened and disposed at positions (e.g., rearward of the pin retainers 24 and extending as far as positions at about half the opening width) at which the front end portions of the guide wall portions 42 do not obstruct the entry and exit of the leader pin 22 when the leader pin 22 enters and exits.

Ribs 38, which are integrated with the outer side guide wall portions 42 exposed through the opening 20 to form a substantially trapezoidal shape when seen in plan view, are disposed at the inner surface of the upper case 16 and the inner surface of the lower case 18 so that the ribs 38 have a height that is the same as that of the guide wall portions 42. The strength of the upper case 16 and the lower case 18 at the opening 20 portion is secured by these ribs 38. It should be noted that, although the inner side guide wall portions 42 are disposed so as to be integral with the pin retainers 24, it is preferable for the height of the pin retainers 24 to be substantially equal to, or higher than, the height of the integrally disposed guide wall portions 42.

The above-described upper case 16 and lower case 18 are fixed (joined) by unillustrated screws being screwed from an underside thereof into the screw bosses 32 and 36 positioned near the edge portions of the opening 20. Thus, corner portions at both ends of the opening 20, which are defined by each free end of the slanted wall portions 30 (front wall 12A) and the slanted wall portions 34 (right wall 12B), have relatively low strength and may collide with the ground or the like when the case 12 is accidentally dropped, are firmly joined so that, even if the case 12 is dropped, the corner portions are not deformed, do not buckle, and do not become positionally offset by the weight of the overall recording tape cartridge 10.

The opening 20 is opened and closed off by the door 50, which serves as a shielding member. The plate width (height) of at least the portion of the door 50 that blocks off the opening 20 is substantially the same as the opened height of the opening 20, and the plate length of the door 50 is sufficiently larger than the opened width of the opening 20. When seen in plan view, the door 50 is formed in a substantial arced shape so that the door 50 can move along a predetermined circumference locus.

The door 50 closes off the opening 20 in a state in which the front end portion of the door 50 has been inserted into the guide wall portions 42 near the slanted wall portions 30, opens up the opening 20 by sliding (rotating) substantially rearward along the predetermined circumference locus, and completely opens up the opening 20 when the outer peripheral surface near the front end of the door 50 reaches the vicinity of the screw bosses 36. The door 50 closes off the opening 20 by sliding (rotating) in the direction opposite to the direction in which it slides when opening up the opening 20.

The door 50 is curved in an arced shape corresponding to the predetermined circumference that is the locus of its movement. With respect to the rotational center of the door 50, in the present embodiment, the position thereof in the left-right direction is set near the left end of the case 12, and the position thereof in the front-rear direction is set near the rear end of the slit 40. Thus, the locus of movement of the door 50 is nearest the right wall 12B of the case 12 in the vicinity of the rear end of the slit 40. It should be noted that the radius and rotational center of the door 50 may be appropriately determined in accordance with the angle of the open surface of the opening 20 determined by the demand from the library device and the position of the front-rear edge portions (slanted wall portions 30 and screw bosses 36) of the opening 20 determined by the demand from the drive device.

The curved longitudinal dimension of the door 50 is determined so that the rear end portion of the door 50 is positioned within the right rear corner portion (in the vicinity of the recess portions 46) further rearward from the recess portions 48 of the case 12 in a state in which the opening 20 is closed off. The rear lower portion of the door 50 is diagonally cut out in order to avoid the memory board (not illustrated) slantingly disposed at the predetermined angle at the rear portion inner wall side of the lower case 18.

The protruding portions 51 are disposed at the upper surface and the lower surface of the door 50. The protruding portions 51 respectively abut against the inner surface of the upper case 16 and the inner surface of the lower case 18 between the guide wall portions 42 and against guide surfaces of the guide wall portions 42 (mutually opposite inner-side surfaces), and guide the door 50 in the directions in which the door 50 opens and closes off the opening 20. The protruding portions 51 are formed in substantially oval shapes, when seen in plan view, which are long along the longitudinal direction of the door 50. Four protruding portions 51 each are disposed on the upper surface and the lower surface of the door 50. The protruding portions 51 are vertically symmetrical with the exception of the rearmost protruding portions 51, and are of a height that is substantially equal to the height of the guide wall portions 42. It should be noted that the reason the rearmost protruding portions 51 are not vertically symmetrical is because the rear lower portion of the door 50 is diagonally cut out.

When the protruding portions 51 are disposed, sliding resistance (friction) between the door 50 and the inner surface of the lower case 18 and the inner surface of the upper case 16 between the guide wall portions 42 and the guide surfaces of the guide wall portions 42 can be reduced, and it becomes possible for the door 50 to smoothly slide with little resistance. Moreover, when the protruding portions 51 are formed in substantially oval shapes when seen in plan view, impact resistance is better than a case where the protruding portions are formed in, for example, substantially circular shapes when seen in plan view. Therefore, there is no worry that the protruding portions 51 will break even if a force acts on the door 50 in directions other than the opening/closing directions due to impact resulting from the case 12 being dropped.

The operational protrusion 52, which serves as an operational portion, is disposed along a radial direction of the door 50 at an outer peripheral surface of the door 50 slightly in front of (near a boundary portion at which the plate width of the door 50 differs) the longitudinal-direction center portion of the door 50. The operational protrusion 52 is exposed to the outer side of the case 12 through the slit 40, is positioned slightly away from the rear ends of the screw bosses 36 in a state in which the opening 20 is closed, and is operable from a portion opening towards the front of the slit 40. In a state in which the opening 20 is opened, the operational protrusion 52 is positioned slightly away from the rear edge of the slit 40, and the rearmost protruding portions 51 abut against the rear end portions of the guide wall portions 42 at this time.

Although the inside of the case 12 can communicate with the outside of the case 12 through the slit 40 for exposing the operational protrusion 52, the slit 40 is, normally, substantially closed off by the screw bosses 36 and the door 50 extending across the substantially entire height inside the case 12. Thus, dust is prevented from adhering to the magnetic tape T wound around the reel 14 due to the play regulation walls 28 serving as the inner wall.

A spring retainer 54, which is substantially "L" shaped when seen in rear view, is integrally disposed at the inner peripheral surface near the rear end of the door 50, and a cylindrical catch portion 55 is disposed facing upward at the inner surface of the lower case 18. Ring-shaped attachment portions 56A and 56B are respectively disposed at both ends of a coil spring 56. The attachment portion 56B is attached to the catch portion 55 by the catch portion 55 being inserted through the attachment portion 56B from therebelow. The attachment portion 56A is attached to the spring retainer 54 by the spring retainer 54 being inserted through the attachment portion 56A from therebelow.

When the catch portion 55 and the spring retainer 54 to which the coil spring 56 is attached are respectively disposed facing upward (in the same direction), it becomes possible to attach the coil spring 56 by inserting the catch portion 55 and the spring retainer 54 through the coil spring 56 from therebelow (in the same direction), whereby assembly of the door 50 and the coil spring 56 (incorporation within the case 12) can be improved. In this manner, the door 50 is constantly urged by an urging force of the attached coil spring 56 in the direction in which the opening 20 is closed off, so that the opening 20 is ordinarily closed off.

Because the door 50 has a length that spans the right rear corner portion of the case 12 in a state in which the opening 20 is closed off, the coil spring 56 serving as urging means can be disposed to effectively use the space between the play regulation walls 28 in the right rear corner portion and the right wall e 12B (peripheral walls 16A and 18A). Stoppers 58, which abut against a side surface of the upper end portion and a side surface of the lower end portion of the leader pin 22 when the opening 20 is closed off, are disposed so as to project from the inner surface of the front end portion of the door 50, and can further prevent the leader pin 22 from falling out of the pin retainers 24 due to impact when the case 12 is dropped.

Next, means for positioning the recording tape cartridge 10 with respect to the drive device will be described. A pocket portion 28A, within which a position-regulating hole is formed, is disposed at an end portion of the play regulation wall 28 near the opening 20. A pocket portion 29, in which a position-regulating hole 29A (see FIGS. 4 and 5)—which is a long hole that is long in the direction of arrow B—is formed, is disposed, apart from the play regulation wall 28, at an inner side of the left front corner portion of the case 12.

The pocket portions 28A and 29 are disposed in a straight line along the direction of arrow B, and the position-regulating hole of the pocket portion 28A is disposed in a rectangular columnar shape when seen in plan view (not shown). With the exception of the end portion at which the pocket portion 28A is disposed, the end portion of each play regulation wall 28 is connected to the peripheral wall 16A or the peripheral wall 18A of the case 12, whereby the inside of the case 12 is partitioned between the outer side of the play regulation walls 28 and the space in which the reel 14 is disposed.

Figure 4:
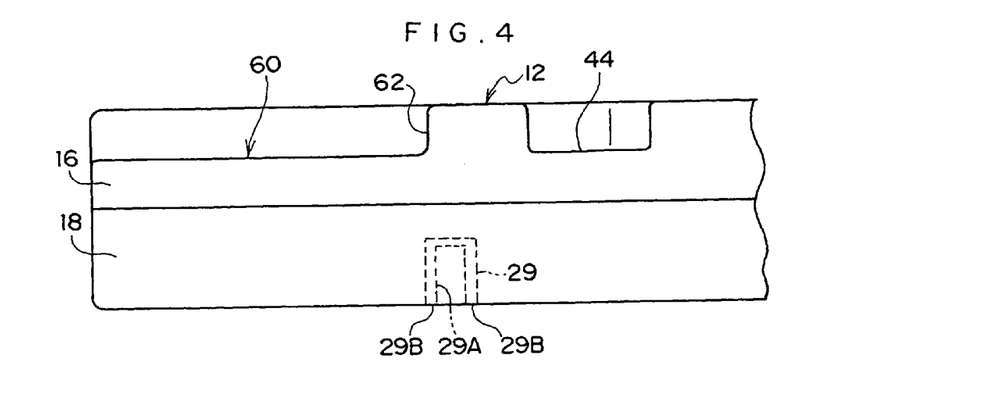
FIG. 4 is a schematic side view showing the positional relationship between the allowance portion formed in the upper case and the reference surface and the position-regulating hole formed in the lower case.
Figure 5:
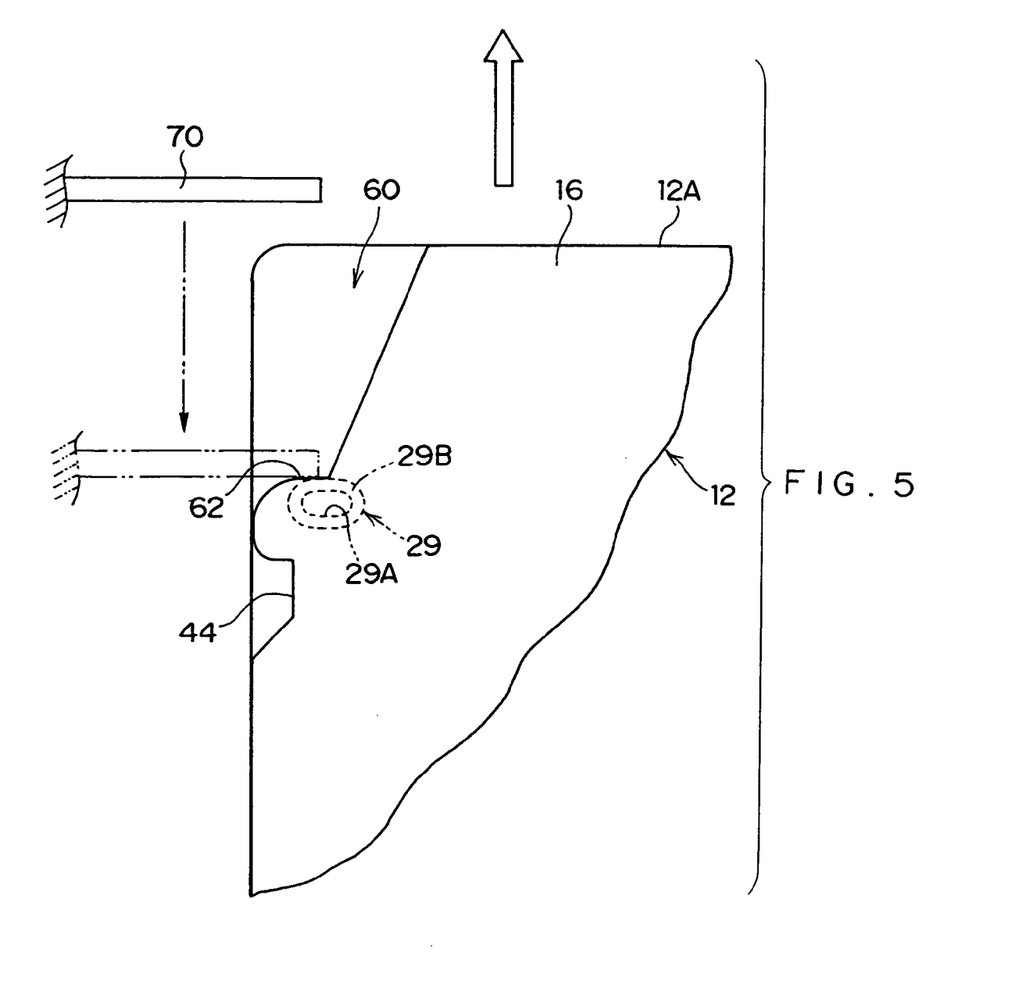
FIG. 5 is a schematic plan view showing the positional relationship between the allowance portion formed in the upper case and the reference surface and the position-regulating hole formed in the lower case.

Positioning members (not shown) disposed at the drive device are inserted into the position-regulating hole of the pocket portion 28A and the position-regulating hole 29A of the pocket portion 29. Also, at the lower surface of the lower case 18, a reference surface 29B, which serves to effect positional regulation in the height direction with respect to the drive device, is formed around the position-regulating hole 29A of the pocket portion 29. The reference surface 29B is formed in a smooth planar shape that is different from the rest of the lower surface of the lower case 18, and is formed in a ring shape with a width that is either substantially the same as or slightly wider than the thickness of the pocket portion 29. It goes without saying that a similar reference surface is also formed around the position-regulating hole of the pocket portion 28A.

At the front wall 12A of the lower case 18, a position-regulating recess portion 64, which is inwardly recessed in a substantially triangular shape, is formed at a place in the front wall 12A near a left wall 12C of the lower case 18. The position-regulating recess portion 64 is one of positioning means that engages with engaging members (not shown) of the drive device to thereby position the position-regulating hole of the pocket portion 28A and the position-regulating hole 29A of the pocket portion 29 with respect to the positioning members.

Figure 3:
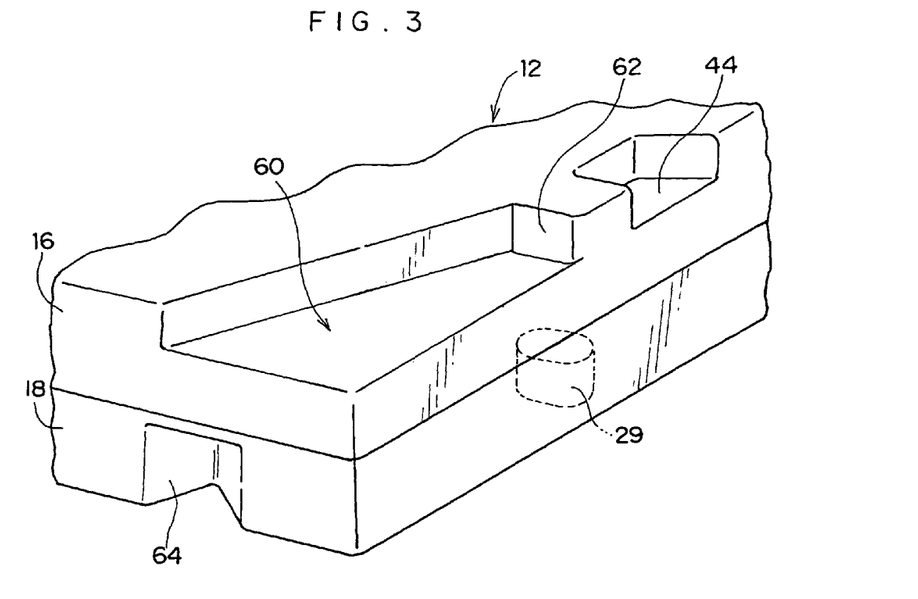
FIG. 3 is a schematic perspective view showing the positional relationship between an allowance portion formed in an upper case and a reference surface and a position-regulating hole formed in a lower case.

As is shown, a concave allowance portion 60, which is a cut out in a substantially trapezoidal shape when seen in plan view, is formed in the corner portion at the left front side of the upper case 16. The allowance portion 60 is formed so that the front and left sides of the upper case 16 open and so that the allowance portion 60 is a step lower than the upper surface of the upper case 16. A rear wall 62 of the allowance portion 60 is formed so that it is parallel to the direction of arrow B when seen in plan view. The allowance portion 60 serves as a guide for preventing the recording tape cartridge 10 from being loaded into the drive device from the wrong direction, and is configured so that it can prevent a rod-shaped stopper 70 of the drive device from abutting against the front wall 12A in a case where recording and playback of the recording tape cartridge 10 are possible in the drive device.

That is, the stopper 70 is disposed at a bucket (not shown) provided at the drive device, so that the stopper 70 faces the front wall 12A of the upper case 16, and is configured so that the length thereof differs in drive devices of different generations (in which recording and playback capabilities differ). It is also configured so that the width of the allowance portion 60 of the recording tape cartridge 10 also differs in each generation (the recording capacity differs in each generation). Depending on whether or not the allowance portion 60 can accept the stopper 70 (i.e., prevent the stopper 70 from abutting against the front wall 12A), it is determined whether or not the recording tape cartridge 10 is capable of being recorded and played back with respect to the drive device (the generation of the recording tape cartridge 10 is discriminated).

Because the stopper 70 is adapted to either abut against the front wall 12A or be prevented from abutting against the front wall 12A by the allowance portion 60 in the instance of the recording tape cartridge 10 being inserted (i.e., before the bucket begins moving), there is the advantage that the generation of the recording tape cartridge 10 can be immediately discriminated, i.e., it can be immediately determined whether or not the recording tape cartridge 10 is capable of being recorded and played back in the drive device.

A case-thickness-direction extended surface of the rear wall 62 in the allowance portion 60 is configured so that it reaches at least the inside of the region of the reference surface 29B. As described above, positioning of the positioning member and the position-regulating hole 29A is primarily effected by the engaging member of the drive device engaging with (abutting against) the position-regulating recess portion 64. However, even in a case where the engaging member that engages with the position-regulating recess portion 64 is not disposed at the drive device, the rear wall 62 can be used so that positioning of the cartridge with respect to the drive device is precisely effected.

In other words, even if at least one of the positioning means does not function (e.g., if the engaging member does not engage with (abut against) the position-regulating recess portion 64), loading of the recording tape cartridge 10 into the drive device is allowed by the allowance portion 60 and then the stopper 70 abuts against the rear wall 62 (the stopper may abut or may not abut against the rear wall 62 when all of the positioning means are functioning). Therefore, by configuring the invention so that the positioning member of the drive device is inserted into the position-regulating hole 29A after this state, positioning of the position-regulating hole 29A (which is important for positioning) with respect to the drive device can be aided (made reliable) by the stopper 70, and positional precision of the recording tape cartridge 10 with respect to the drive device can be improved.

Next, the action of the present embodiment with respect to the recording tape cartridge 10 of the above configuration will be described. In the recording tape cartridge 10 of the above-described configuration, the opening 20 is closed off by the door 50 when the recording tape cartridge 10 is not in use (during storage or transport). When the magnetic tape T is to be used, the recording tape cartridge 10 is loaded into the drive device along the direction of arrow A.

At this time, because the allowance portion 60 is formed, the recording tape cartridge 10 can be loaded without mistaking the loading direction thereof. Depending on whether or not the stopper disposed at the drive device is allowed by the allowance portion 60, it is determined whether or not recording and playback of the cartridge are possible in the drive device.

When the stopper 70 is prevented from abutting against the front wall 12A by the allowance portion 60, it is determined that the recording tape cartridge 10 can be recorded and played back in the drive device, and the recording tape cartridge 10 is loaded into the drive device. An opening/closing member (not shown) of the drive device enters the slit 40, which opens frontward, in accompaniment with the loading, and engages with the operational protrusion 52 of the door 50.

In this state, when the recording tape cartridge 10 (case 12) is further pushed in, the opening/closing member relatively moves the operational protrusion 52 (relatively moves the operational protrusion 52 rearward with respect to the case 12 loaded in the direction of arrow A), counter to the urging force of the coil spring 56, by the pushing force. Thus, the door 50, on which the operational protrusion 52 is disposed, rotates in a clockwise direction (when seen in plan view) along the direction in which it is curved, as the protruding portions 51 are guided by the guide wall portions 42.

That is, the door 50 moves substantially rearward around the outer side of the reel 14 and the pin retainers 24, without sticking out from the locus of movement along the curved shape thereof due to the guidance by the guide wall portions 42, to open the opening 20. When the case 12 (recording tape cartridge 10) is loaded to a predetermined depth in the drive device, the opening 20 is completely opened. At this time, the engaging member of the drive device engages with (abuts against) the position-regulating recess portion 64, whereby further advancement (loading) of the recording tape cartridge 10 is prevented. However, when the engaging member is not disposed at the drive device, the stopper 70 abuts against the rear wall 62 of the allowance portion 60, whereby further advancement (loading) of the recording tape cartridge 10 is prevented.

In this state, the positioning members (not shown) of the drive device are respectively inserted into the position-regulating hole formed in the pocket portion 28A and the position-regulating hole 29A formed in the pocket portion 29 of the recording tape cartridge 10. At this time, because the case-thickness-direction extended surface of the rear wall 62 in the allowance portion 60 reaches at least the inside of the region of the reference surface 29B (in other words, because the rear wall 62 of the allowance portion 60 is positioned right above, i.e., in the vertically upward direction of the pocket portion 29 (including the position-regulating hole 29A and the reference surface 29B)), by setting the position of the rear wall 62 so that the stopper 70 is appropriately stopped, the position of the position-regulating hole 29A with respect to the positioning member can be more precisely defined.

When the positioning members are inserted into the position-regulating hole formed in the pocket portion 28A and the position-regulating hole 29A formed in the pocket portion 29 and the recording tape cartridge 10 is precisely positioned inside the drive device, further rotation (substantially rearward movement) of the door 50 is regulated, the pull-out means of the drive device enters the case 12 through the opened opening 20, and the pull-out means pulls out the leader pin 22 positioned and retained by the pin retainers 24.

At this time, as the opening 20 is formed so that the right front corner portion thereof is cut out, the open surface thereof faces the direction of arrow A and the direction of arrow B. Thus, the pull-out means of the drive device can access and chuck the leader pin 22 from the direction of arrow A, the direction of arrow B, or a direction between the direction of arrow A and the direction of arrow B. That is, because the region in which the pull-out means of the drive device can chuck the leader pin 22 is sufficiently wide, the positions at which the pin retainers 24 are disposed can be set to match the specification of the pull-out means, and the degree of freedom with which the drive device is designed can be increased.

The leader pin 22 pulled out through the opening 20 is accommodated at an unillustrated take-up reel. The take-up reel and the reel 14 are synchronously rotatingly driven, whereby the magnetic tape T is successively pulled out from the case 12 as it is taken up at the take-up reel, and information is recorded and played back by a recording/playback head disposed along a predetermined tape path.

When the magnetic tape T is to be rewound and the recording tape cartridge 10 is to be discharged from the drive device, the positioning member is pulled out from the position-regulating hole 29A and the positioned state of the recording tape cartridge 10 is released. The recording tape cartridge 10 is then moved in the opposite direction of arrow A by the urging force of the coil spring 56 or an unillustrated ejecting mechanism.

The door 50 is rotated, by the urging force of the coil spring 56, in the direction in which the opening 20 is closed off as the projections 51 are guided by the guide wall portions 42, to completely close off the opening 20 (restore the opening 20 to its initial state). The stopper 70 is also distanced from the rear wall 62 of the allowance portion 60, and the recording tape cartridge 10 is ejected from the drive device.

According to the above-described configuration of the invention, positional precision of a recording tape cartridge with respect to a drive device can be improved.

What is claimed is:

1. A recording tape cartridge comprising:
    a case within which a reel wound with a recording tape is housed;
    an allowance portion formed as a recess portion in an upper surface of the case, the allowance portion allowing an engaging member disposed at a drive device to advance toward the recess portion and thereby preventing the engaging member from abutting against a front surface of the case in a direction in which the case is inserted when recording and playback of the recording tape cartridge is possible in the drive device;
    a rear wall formed at the allowance portion, wherein, when the engaging member reaches the rear wall, the rear wall engages and retains the engaging member, whereby the recording tape cartridge does not advance past a predetermined position into the drive device;
    a position-regulating hole that is formed in a lower surface of the case and into which a positioning member of the drive device is inserted; and
    a reference surface formed around the position-regulating hole in the lower surface of the case, wherein a case-thickness-direction extended surface of the rear wall is positioned at least in a region of the reference surface.

2. The recording tape cartridge of claim 1, wherein the engaging member engages with and is retained at the rear wall and advancement of the recording tape cartridge is prevented, whereby the positioning member of the drive device is positioned in the position-regulating hole.

3. The recording tape cartridge of claim 1, wherein the case-thickness-direction extended surface of the rear wall substantially coincides with the reference surface.

4. A recording tape cartridge, comprising:
    a case within which a reel wound with a recording tape is housed;
    a position-regulating hole that is formed in a lower surface of the case and into which a positioning member of a drive device is inserted;
    a reference surface formed around the position-regulating hole in the lower surface of the case;
    an allowance portion formed as a recess portion in an upper surface of the case, the allowance portion allowing an engaging member disposed at the drive device to advance toward the recess portion and thereby preventing the engaging member from abutting against a front surface of the case in a direction in which the case is inserted when recording and playback of the recording tape cartridge is possible in the drive device; and
    a rear wall formed at the allowance portion,
    wherein a case-thickness-direction extended surface of the rear wall is positioned at least within a region of the reference surface.

5. The recording tape cartridge of claim 4, wherein the engaging member engages with and is retained at the rear wall and advancement of the recording tape cartridge is prevented, whereby the positioning member of the drive device is positioned in the position-regulating hole.

6. The recording tape cartridge of claim 4, wherein the case-thickness-direction extended surface of the rear wall substantially coincides with the reference surface.

7. The recording tape cartridge of claim 4, wherein a second recess portion is disposed in the upper surface of the case, and said second recess portion is separated from the allowance portion by the rear wall.

* * * * *